INVENTORS
G. J. WEBSTER
O. K. AUSTIN
BY
Hudson and Young
ATTORNEYS

Feb. 9, 1960 G. J. WEBSTER ET AL 2,924,512
CARBON BLACK APPARATUS

Original Filed June 1, 1954 4 Sheets-Sheet 2

INVENTORS
G. J. WEBSTER
O. K. AUSTIN
BY
Hudson and Young
ATTORNEYS

Feb. 9, 1960 G. J. WEBSTER ET AL 2,924,512
CARBON BLACK APPARATUS
Original Filed June 1, 1954 4 Sheets-Sheet 3
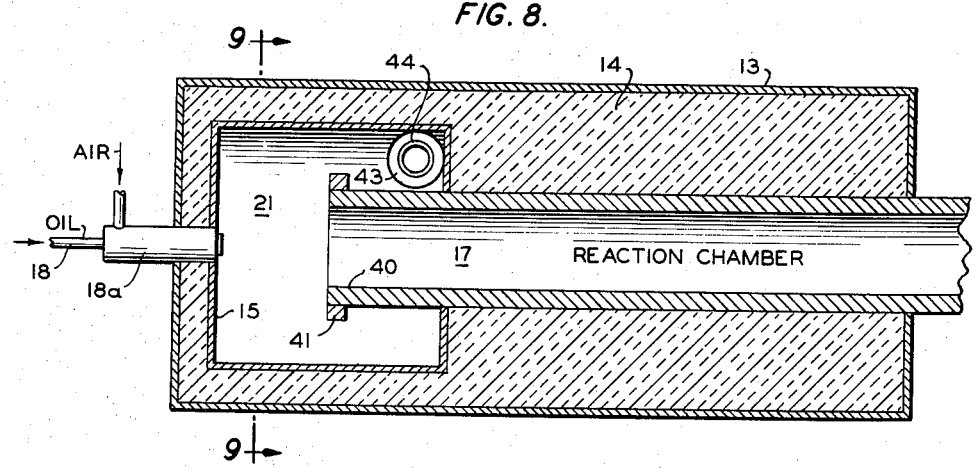
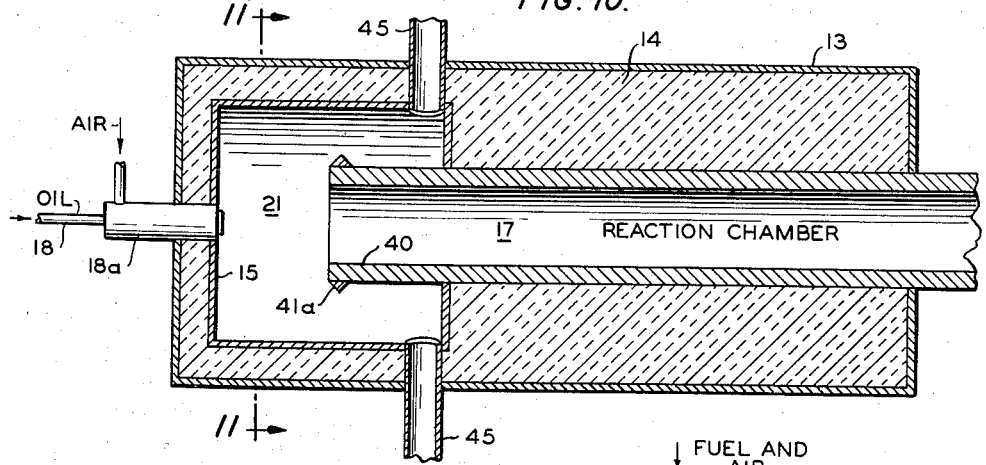
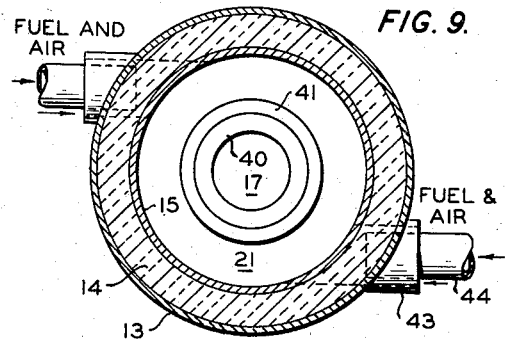
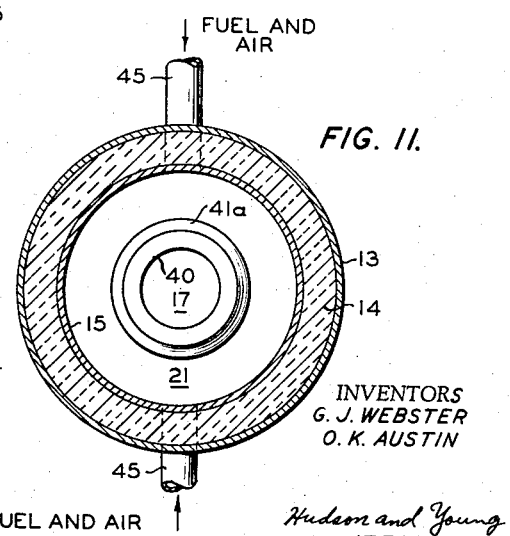
INVENTORS
G. J. WEBSTER
O. K. AUSTIN
Hudson and Young
ATTORNEYS Feb. 9, 1960     G. J. WEBSTER ET AL     2,924,512
CARBON BLACK APPARATUS
Original Filed June 1, 1954     4 Sheets-Sheet 4

INVENTORS
G. J. WEBSTER
O. K. AUSTIN
BY
Hudson and Young
ATTORNEYS

United States Patent Office 2,924,512
Patented Feb. 9, 1960

2,924,512

CARBON BLACK APPARATUS

George J. Webster, Bartlesville, Okla., and Oliver K. Austin, Borger, Tex., assignors to Phillips Petroleum Company, a corporation of Delaware Original application June 1, 1954, Serial No. 433,496. Divided and this application February 14, 1957, Serial No. 640,118

5 Claims. (Cl. 23—259.5)

This invention relates to the production of carbon black by the pyrolysis or partial combustion of hydrocarbons. In one aspect, it relates to a process wherein the air, combustion gas, or heating gas is preheated prior to utilization in the formation of carbon black. In another aspect, it relates to a process wherein heat is transferred, by indirect heat exchange, to a stream of hydrocarbon which is being reacted to form carbon black. In another aspect, it relates to a novel apparatus for the production of carbon black, in which apparatus there is provided means for indirect heat exchange between reacting materials and materials entering the system.

This application is a division of our copending application Serial No. 433,496, filed June 1, 1954.

It is known in the prior art to produce carbon black by passing a stream of reactant hydrocarbons through a reaction zone in which there is maintained a helically moving blanket or sheath of hot gas adjacent an inner wall of such a zone. In such a process, heat is transferred by direct heat exchange from the helically moving blanket or sheath of hot gases directly to the reactant hydrocarbon introduced within said sheath or blanket, and deposition of carbon upon the walls of the reaction zone is substantially prevented. Processes of this type have enjoyed great commercial success on account of their capacity to produce high-grade carbon black at extremely high throughputs. Processes and apparatus of this type are exemplified in U.S. Patents 2,375,795, 2,375,796, 2,375,797, 2,375,798 (1945), and 2,564,700 (1951).

Although, as stated, carbon black processes and apparatus of the type described have been extremely satisfactory, attempts are constantly being made to improve such processes and apparatus.

This invention is an improvement of the processes of the type described and provides a process and an apparatus wherein carbon black is produced with increased facility and improved heat economy.

According to this invention, carbon black is produced by a process which comprises passing a reactant hydrocarbon axially through a reaction zone maintained at the carbon black-forming temperature; passing a gas capable of producing said carbon black-forming temperature through a heating zone in indirect heat exchange with said reaction zone; introducing gas from said heating zone into said reaction zone to form initially therein a turbulent blanket of hot gas adjacent the periphery of said reaction zone and thus maintain said carbon black-forming temperature in said reaction zone; reacting said reactant hydrocarbon in said reaction zone to form carbon black by virtue of heat directly imparted to said reactant hydrocarbon from said blanket of hot gas; and recovering said carbon black as a product of the process.

Further, according to this invention, there is provided an apparatus for carrying out the above-described process of the invention. The apparatus comprises a carbon black reactor of the turbulent flame type having a heating zone at least partially encompassing the reaction zone. The heating zone is in open communication with the reaction zone through inlets or conduits adapted to direct fluid from the heating zone tangentially or longitudinally into the reaction zone, or into a precombustion zone in communication therewith, so that the previously described blanket or sheath of hot gas can be provided in the reaction zone.

Several embodiments of this invention are illustrated in the drawings.

Figure 8 is a sectional elevation of a modified form of the apparatus shown in Figure 4.

Figure 9 is a cross-sectional view taken along line 9—9 of Figure 8.

Figure 10 is a sectional elevation of another modified form of the apparatus shown in Figure 4.

Figure 11 is a cross-sectional view taken along line 11—11 of Figure 10.

Figure 1:
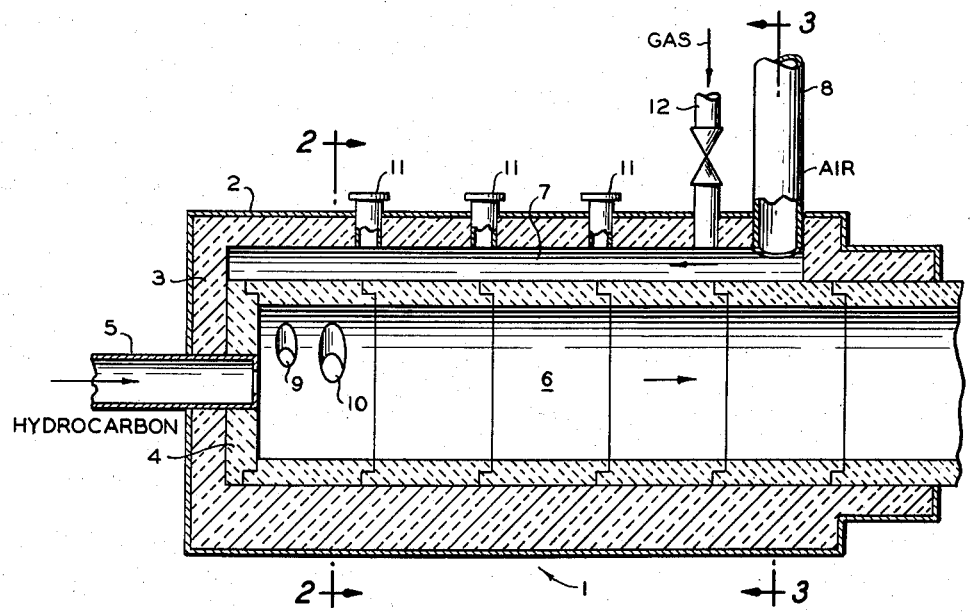
Figure 1 is a side elevational view of one reactor in accordance with this invention.
Figures 2, 3:
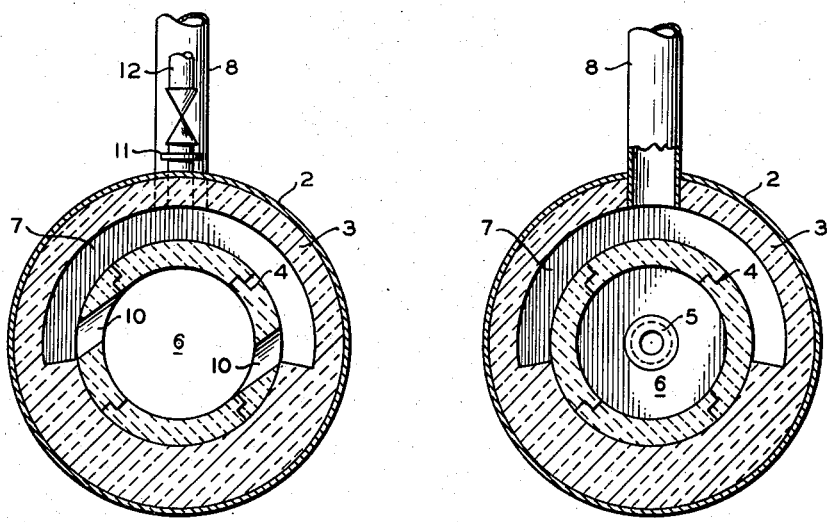
Figure 2 is an end view taken along line 2—2 in Figure 1.
Figure 3 is an end view taken along line 3—3 in Figure 1.

According to Figure 1, a carbon black reactor designated generally by the numeral 1 comprises an outer shell 2, insulation 3, and refractory member 4, which is shown as being sectionally constructed of interlocking refractory pieces. Partially surrounding or encompassing refractory member 4 and reaction chamber 6 is heating chamber 7, which is coaxial with reaction chamber 6. Hydrocarbon inlet 5 is provided in the end wall of reaction chamber 6. Air inlet 8 is provided in the end of heating chamber 7 at a point opposite the hydrocarbon inlet 5. Gas inlet 12 is also provided in heating chamber 7. Heating chamber 7 and reaction chamber 6 are in open communication with each other through one or more inlets, which are indicated in Figure 1 as inlets 9 and 10. Inlets or conduits 9 and 10 are positioned tangentially with respect to the inner cylindrical wall of reaction chamber 6. Wells or sight glasses 11 are provided in the exterior wall of chamber 7 so that temperatures therein can be measured by means of thermocouples, optical pyrometers, or similar devices. Any number of wells or sight glasses 11 can be provided, or they can be omitted altogether.

In operation, a reactant hydrocarbon capable of being converted to carbon black enters reaction chamber 6 through inlet 5. According to one embodiment of this invention, air enters inlet 8 and passes through chamber 7 countercurrently to hydrocarbon entering through inlet 5. In this process embodiment, the valve in line 12 is closed; and no gas, other than air or other oxygen-containing gas, enters chamber 7. From chamber 7, the air passes tangentially through conduits 9 and 10 and reacts with part of the hydrocarbon entering through inlet 5 by combustion, thus forming initially a helically traveling blanket of flame and/or combustion gases adjacent the inner wall of reaction chamber 6. There is always maintained within reaction chamber 6 a molecular deficiency of air, with respect to the hydrocarbon introduced through inlet 5, so that the hydrocarbon remaining unreacted by partial combustion is thermally converted to carbon black as a result of the heat produced by the partial combustion, this heat being directly imparted to the reactant hydrocarbon from the helically moving blanket of combustion gas adjacent the walls of reaction chamber 6. It will be noted that the direction of travel of the helically moving sheath of hot gas into reaction chmaber 6 is directly opposite to the direction of gas flowing through chamber 7. Thus, the air entering inlet 8 is preheated during its travel through chamber 7, thus effecting increased heat economy and facilitating the carbon black-forming reaction.

The refractory member 4 is preferably constructed of a refractory having a relatively high heat transfer coefficient, e.g., Carbofrax (trade name).

According to another process embodiment of this invention, gas can be introduced into heating chamber 7 through inlet 12. Any suitable fuel gas, such as carbon monoxide, hydrogen, methane, residue gas, or the like, can be used. A normally liquid hydrocarbon can be used if desired. The gas introduced through inlet 12 and the air introduced through inlet 8 are introduced in proportions such that a combustible mixture is formed in chamber 7. Thus, a stream of hot combustion gas is supplied to reaction chamber 6, making unnecessary any extensive combustion of reactant hydrocarbon introduced through inlet 5. Since the carbon black-forming reaction is endothermic, the temperature of the reacting material in chamber 6 tends to decrease as the material progresses toward the outlet of chamber 6. Since the combustion of gas and of air within chamber 7, according to this invention, is exothermic, heat is thereby supplied to reaction chamber 6 by indirect heat exchange, thus compensating for temperature drop which would otherwise occur within chamber 6 as a result of the endothermic reaction therein.

Figure 4:
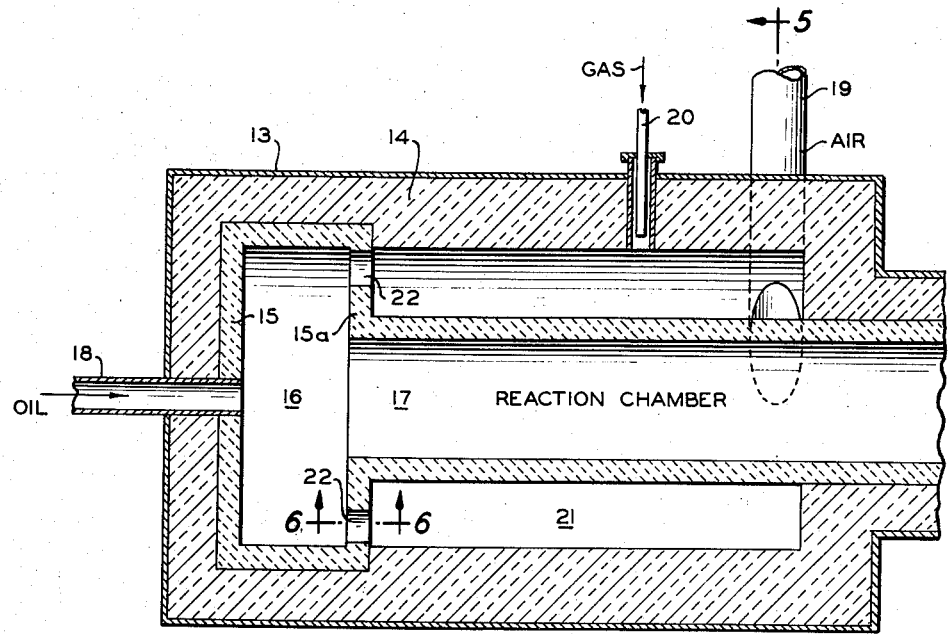
Figure 4 is a side elevational view of another type of reactor within the scope of this invention.
Figure 5:
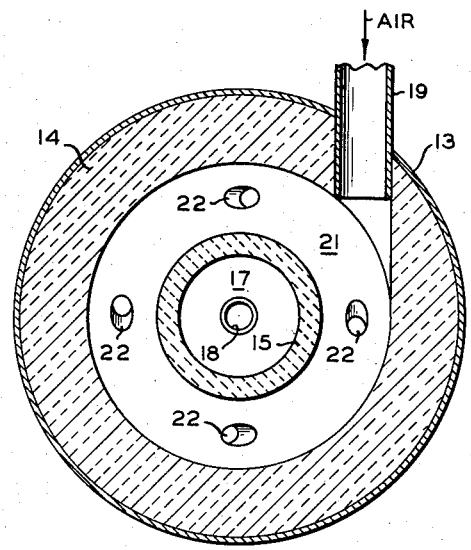
Figure 5 is an end view taken along line 5—5 in in Figure 4.

As shown in Figure 4, the carbon black reactor comprises outer shell 13, insulation 14, and refractory lining 15. A reactant hydrocarbon inlet 18 is provided, as in Figure 1. A reaction chamber 17 is coaxial with, and in open communication with, a combustion chamber 16 which has a larger diameter and, preferably, a shorter length than chamber 17. Completely encircling or encompassing reaction chamber 17 is a heating chamber 21 which communicates directly with combustion chamber 16 through conduits 22 in wall 15A. Although four of the conduits 22 are shown in Figure 5, any number may be used. If desired, only a single conduit 22 can be used. Air inlet 19 and gas inlet 20 are provided in heating zone 21, as previously described.

As shown in Figure 5, air inlet 19 is preferably positioned tangentially with respect to the inner wall of heating zone 21. Gas inlet 20 also is preferably tangential with respect to the inner surface of heating zone 21, although not visible in Figure 5.

Figure 6:
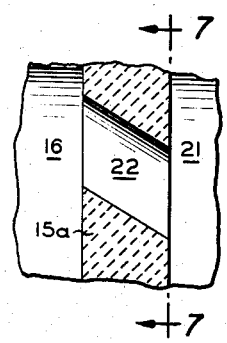
Figure 6 is a view of port 22 of Figure 4, said view being taken along line 6—6 in Figure 4.
Figure 7:
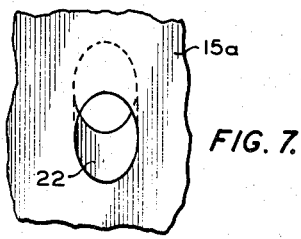
Figure 7 is an end view of the burner port of Figure 6, taken along line 7—7 in Figure 6.

As shown in Figures 6 and 7, conduits 22 are positioned obliquely with respect to the common axis of chambers 16, 17, and 21 and in a direction corresponding to the helical path of gases in chamber 21.

Air and gas in combustible proportions enter heating zone 21 through conduits 19 and 20, respectively. Combustion begins in heating zone 21, supplying heat by indirect heat exchange to reaction chamber 17. The reacting mixture of gas and air passes through heating zone 21, through conduits 22 and into combustion zone 16, wherein the resulting mixture of combustion gases travels spirally toward the axis of combustion chamber 16. Combustion is substantially complete by the time the mixture leaves the periphery of chamber 16 and can even be completed within chamber 21. Reactant hydrocarbon is introduced axially into the reactor through inlet 18 and travels through conduit 17 surrounded initially by a helically moving blanket of hot gases which flow from combustion chamber 16 through conduit 17 to cooling and carbon black recovery apparatus, subsequently described.

If desired, gas inlet 20 can be closed, by means not shown, and air alone can be supplied to chamber 21, as described in connection with Figure 1.

A feature of this invention is that the fuel gas inlet, 12 in Figure 1 or 20 in Figure 4 can be positioned at any point between the air inlet and the passage establishing communication between the annular heating chamber and the reaction chamber. Alternatively, premixed fuel gas and air can be supplied through the air conduit. Thus when air alone is supplied to the annular heating chamber, it is preheated and, as a result of the indirect heat exchange with the mixture in the reaction chamber, a maximum temperature gradient in the flowing reaction mixture is established. Conversely, when a combustible mixture of gas and air is supplied through inlet 19 in Figure 4, for example, combustion in chamber 21 heats the flowing reaction mixture in tube 17 and establishes a minimum temperature gradient in the reaction mixture. By selecting the point of introduction of fuel gas, any intermediate temperature gradient can be obtained. Also any number of gas inlets communicating with chamber 21 or 7 can be used and can be connected to a manifold. Thus the point of introduction of the gas can be varied at will, or the total amount of fuel gas can be added in increments, with resultant variation in reaction temperature as described.

Figures 8 and 9 show a modified form of the apparatus of Figures 4 and 5, corresponding numerals indicating corresponding parts. Refractory tube 40 forms reaction zone 17 and extends into combustion chamber 21. Oil inlet 18 is provided with air jacket 18A. At the end of cylinder 40 is a baffle ring 41, which is ordinarily of the same refractory material as tube 40 and can be integral therewith or fabricated as a separate part. Two tangential inlets or tunnels 43 are provided in combustion chamber 21. In each tunnel is positioned a tube or burner 44. Although 44 is shown as a simple tube, it can be a gas or oil burner of any desired type.

Oil or other reactant hydrocarbon convertible to carbon black is supplied to the furnace through inlet 18. A small amount of air is supplied to jacket 18A to facilitate atomization of the reactant and minimize or prevent carbon deposition at the end of inlet 18 and to cool the inlet. A combustible mixture of air or other oxygen-containing gas, and fuel, such as natural gas, is supplied at a high velocity to tubes 44. The combustible mixture enters and burns in tunnels 43 and chamber 21, forming a helically moving, hot combustion gas which travels toward inlet 18 and suddenly reverses direction, upon reaching the end wall of the furnace, and travels into reaction chamber 17, together with the reactant entering through inlet 18. Heat is thus transferred directly to the reactant from the highly turbulent combustion gas causing the reactant to react and form carbon black which is recovered as subsequently described herein. Baffle ring 41 increases the turbulence of the combustion gases, thus facilitating mixing and heat transfer.

The furnace or reactor shown in Figures 10 and 11 are similar in design and operation to that shown in Figures 8 and 9, except that the combustible mixture enters chamber 21 radially, instead of tangentially, through inlets 45. Also baffle ring 41A has a triangular, instead of a rectangular cross-section. Other cross-sectional configurations, e.g. trapezoidal, can be used. The baffle ring can be omitted if desired. Any desired number of radial or tangential inlets, including one, can be used in the apparatus of Figures 8 to 11.

Figure 12:
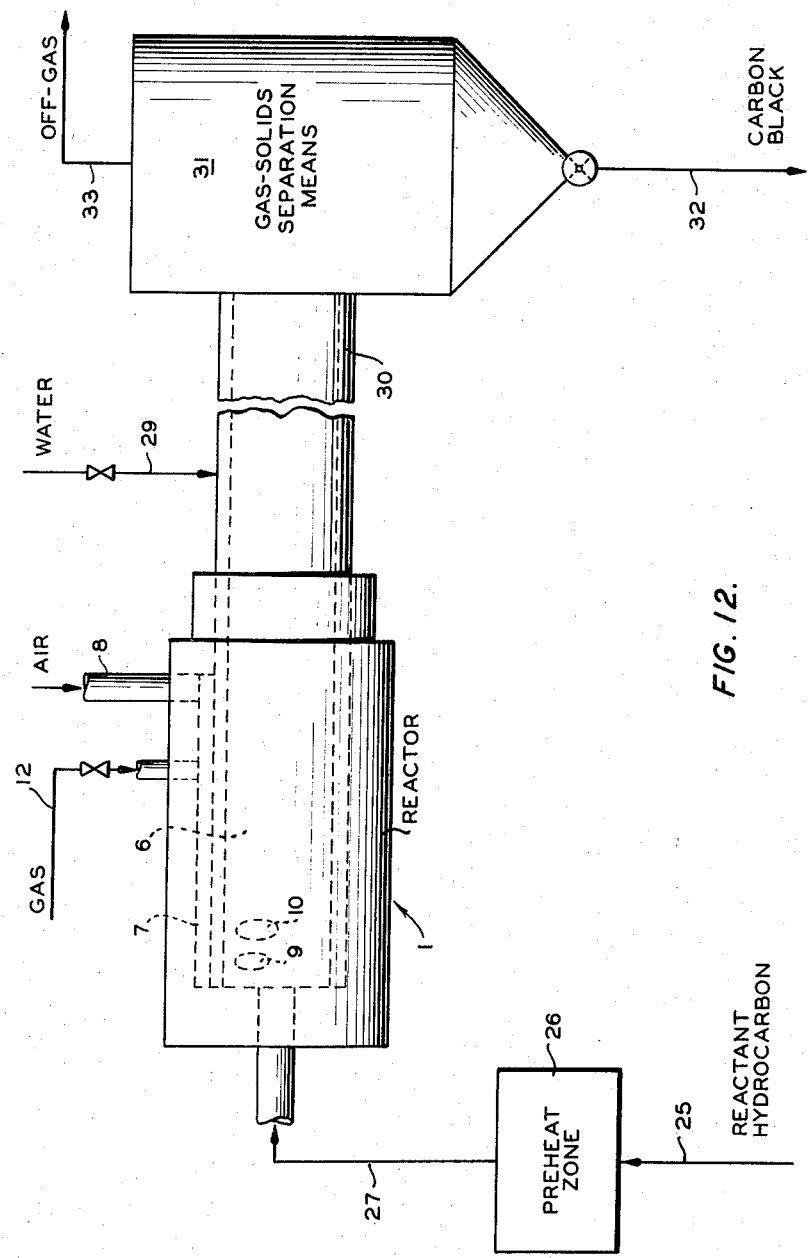
Figure 12 is a schematic flow sheet illustrating the process of this invention.

The general flow of materials, according to the present invention, is shown diagrammatically in Figure 12. Reactant hydrocarbon enters preheating zone 26 through inlet 25. In zone 26, the reactant hydrocarbon is preheated and/or vaporized, the resulting temperature preferably being not greater than the temperature of incipient cracking, although some cracking can be effected if desired. The preheated hydrocarbon passes through conduit 27 to reactor 1 which, for purposes of illustration, may be considered to be reactor 1 in Figure 1. Air enters the reactor through inlet 8; and, if desired, a gas can be supplied through inlet 12. Air, with or without fuel gas, passes countercurrently through heating chamber 7 (Figure 1) with respect to reactant hydrocarbon and subsequently enters the reaction zone of reactor 1 to form a helical sheath of hot gas, as described in connection with Figure 1. A reaction mixture comprising combustion gas and carbon black is withdrawn through reactor 1 and passed through pipe 30. The reaction mixture is cooled to a temperature below reaction temperature, e.g. below 1000° F., by water which can be injected into the mixture through quench inlet 29. This effects a quick cooling or quench. Further cooling of the mixture can be obtained by means of indirect heat exchange, not shown in the drawing, or by atmospheric cooling obtained by omitting insulation from pipe 30. The cooled mixture of gas and carbon black enters separation means 31, which can be any known means for separating finely divided solids from gases. Examples of such means are Cottrell precipitators, cyclone separators, and bag filters. Any desired combination of these means can be used, as desired. Product carbon black is removed through outlet 32, and off-gas is removed through outlet 33.

The reactant hydrocarbon utilized in the process of this invention is preferably a predominantly aromatic or cyclic hydrocarbon mixture, such as a recycle gas oil obtained in a thermal or catalytic cracking process. Other hydrocarbon materials are, however, usable. Examples are gas oils, fuel oils, kerosene, gasoline, liquefied petroleum gases, and methane.

The gas capable of producing a carbon black-forming temperature within the reaction zone of the carbon black reactor can be air, oxygen, mixtures of air and oxygen, and mixtures of such oxidizing gases with fuel gases, as previously described. Also, such a gas can be merely an inert gas, such as hydrogen or nitrogen, which has previously been heated to a sufficiently high temperature to impart sufficient heat to the reactant hydrocarbon to cause said hydrocarbon to react to form carbon black.

Carbon black-forming temperatures are generally known in the art. They are generally within the range 2200 to 4000° F. However, temperatures outside this range are sometimes used. In ordinary practice, the temperature within the reaction chamber will be of the order of 2400 to 3000° F.

The relative proportions of hydrocarbons and air introduced into the carbon black reactor are well understood in the art. It is well recognized that an overall stoichiometric deficiency of air with respect to hydrocarbon is necessary. Examples of such ratios of air to hydrocarbon are given in the patents cited previously herein.

Although process steps, structures, and examples have been described for purposes of illustration, the invention is clearly not limited thereto. Variation and modification are possible within the scope of the foregoing disclosure and the claims to this invention. It will be evident from the foregoing that according to the invention there is provided, in a process wherein hydrocarbon is reacted to form carbon black by direct heat exchange with a turbulent body of hot gas, the step of passing said gas, or a gas which by chemical reaction produces said gas, countercurrently with respect to the mixture of reactant hydrocarbon and said gas prior to the direct heat exchange between said gas and said reactant hydrocarbon and that an apparatus has been provided for effecting such heat exchange, said apparatus including a heating chamber at least partially surrounding a reaction chamber and in communication therewith through conduits so positioned as to direct gas from said heating chamber longitudinally or tangentially into the reaction chamber.

We claim:

1. A carbon black production apparatus comprising, in combination: an elongated substantially cylindrical, unobstructed reaction chamber disposed with its axis substantially horizontal and having a refractory side wall and a refractory end wall; hydrocarbon inlet means positioned axially in said end wall; unrestricted outlet means at the end of said chamber opposite said end wall; a heat insulated heating chamber partially encompassing said side wall only throughout substantially the upper half thereof and in open communication with said reaction chamber through a plurality of openings in said side wall, said openings being positioned adjacent said end wall and substantially tangential to the inner surface of said side wall; inlet means in communication with said heating chamber at the end thereof opposite said openings connected to fuel and air supply means located externally of the carbon black furnace, and a heat insulating bed supporting the major area of the lower half of said refractory side wall, whereby sagging of said side wall during heating is obviated; said inlet means being spaced from said openings a substantial distance and disposed so that the entire movement of fluids in said heating chamber is countercurrent to the movement of fluids in said reaction chamber.

2. A carbon black furnace comprising in combination an elongated substantially cylindrical, unobstructed reaction chamber disposed with its axis substantially horizontal and having a refractory side wall and a refractory end wall, hydrocarbon inlet means positioned axially in said end wall, unrestricted outlet means at the end of said chamber opposite said end wall, a supporting means for said chamber comprising a hollow body surrounding said chamber and provided with a generally semi-annular bed of heat insulating material in supporting contact with the major area of the lower portion of said side wall, and provided with a generally semi-annular heating chamber encompassing the remaining area of said side wall and in open communication with said reaction chamber through a plurality of openings in said side wall, said openings being positioned adjacent said end wall and substantially tangential to the inner surface of said side wall; and fuel and free oxygen containing gas inlet means in communication with said heating chamber at the end thereof opposite said openings and connecting the same with supply means for said fuel and said gas located externally of the carbon black furnace; said inlet means being spaced from said openings a substantial distance and disposed so that the entire movement of fluids in said heating chamber is countercurrent to the movement of fluids in said reaction chamber.

3. A carbon black furnace comprising in combination an elongated substantially cylindrical, unobstructed reaction chamber disposed with its axis substantially horizontal and having a refractory side wall and a refractory end wall, hydrocarbon inlet means positioned axially in said end wall, unrestricted outlet means at the end of said chamber opposite said end wall, a supporting means for said chamber comprising a hollow body surrounding said chamber and provided with a generally semi-annular bed of heat insulating material in supporting contact with the major area of the lower portion of said side wall, and provided with a generally semi-annular heating chamber encompassing the remaining area of said side wall and in open communication with said reaction chamber through a plurality of openings in said side wall, said openings being positioned adjacent said end wall and substantially tangential to the inner surface of said side wall; and separate gas fuel and free oxygen containing gas inlet means in communication with said heating chamber at the end thereof opposite said openings and connecting the same with supply means for said fuel and said gas located externally of the carbon black furnace respectively; said inlet means being spaced from said openings a substantial distance and disposed so that the entire movement of fluids in said heating chamber is countercurrent to the movement of fluids in said reaction chamber.

4. A carbon black furnace comprising in combination an elongated substantially cylindrical, unobstructed reaction chamber disposed with its axis substantially horizontal and having a refractory side wall and a refractory end wall, hydrocarbon inlet means positioned axially in said end wall, unrestricted outlet means at the end of said chamber opposite said end wall, a supporting means for said chamber comprising a hollow body surrounding said chamber and provided with a generally semi-annular bed of heat insulating material in supporting contact with the major area of the lower portion of said side wall, and provided with a generally semi-annular heating chamber encompassing the remaining area of said side wall and in open communication with said reaction chamber through a plurality of openings in said side wall, said openings being positioned adjacent said end wall and substantially tangential to the inner surface of said side wall; and separate gas fuel and free oxygen containing gas inlet means in communication with said heating chamber at the end thereof opposite said openings and connecting the same with supply means for said fuel and said gas located externally of the carbon black furnace respectively; said inlet means being spaced from said openings a substantial distance and disposed so that the entire movement of fluids in said heating chamber is countercurrent to the movement of fluids in said reaction chamber; said gas fuel and said free oxygen containing gas inlet means being disposed radially at the top of said heating chamber with said gas fuel inlet means entering said heating chamber downstream of said free oxygen containing gas inlet means.

5. A carbon black furnace comprising in combination an elongated substantially cylindrical, unobstructed reaction chamber disposed with its axis substantially horizontal and having a refractory side wall and a refractory end wall, hydrocarbon inlet means positioned axially in said end wall, unrestricted outlet means at the end of said chamber opposite said end wall, a supporting means for said chamber comprising a hollow body surrounding said chamber and provided with a generally semi-annular bed of heat insulating material in supporting contact with the major area of the lower portion of said side wall, and provided with a generally semi-annular heating chamber encompassing the remaining area of said side wall and in open communication with said reaction chamber through a plurality of openings in said side wall, said openings being positioned adjacent said end wall and substantially tangential to the inner surface of said side wall; fuel and free oxygen containing gas inlet means in communication with said heating chamber at the end thereof opposite said openings and connecting the same with supply means for said fuel and said gas located externally of the carbon black furnace; said inlet means being spaced from said openings a substantial distance and disposed so that the entire movement of fluids in said heating chamber is countercurrent to the movement of fluids in said reaction chamber; hydrocarbon preheating means in said hydrocarbon inlet means exterior of said furnace, water spray quench means in said outlet means at the end of said chamber, and gas-solids separation means connected to said outlet means downstream of said quench means.

References Cited in the file of this patent

UNITED STATES PATENTS

| | | |
|---|---|---|
| 1,618,808 | Burg | Feb. 22, 1927 |
| 2,302,156 | Totzek | Nov. 17, 1942 |
| 2,302,157 | Totzek | Nov. 17, 1942 |
| 2,343,866 | Hincke | Mar. 14, 1944 |
| 2,498,444 | Orr | Feb. 21, 1950 |
| 2,657,117 | Sperberg | Oct. 27, 1953 |
| 2,785,054 | Bethea et al. | Mar. 12, 1957 |